United States Patent
Ono et al.

(10) Patent No.: US 12,030,218 B2
(45) Date of Patent: Jul. 9, 2024

(54) FIBER-REINFORCED RESIN MOLDING MATERIAL AND MOLDED ARTICLE THEREOF

(71) Applicant: Toray Industries, Inc., Tokyo (JP)

(72) Inventors: Yasukazu Ono, Nagoya (JP); Takafumi Hashimoto, Nagoya (JP); Tetsuya Motohashi, Nagoya (JP); Tadashi Watanabe, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 610 days.

(21) Appl. No.: 17/287,801

(22) PCT Filed: Oct. 30, 2019

(86) PCT No.: PCT/JP2019/042545
§ 371 (c)(1),
(2) Date: Apr. 22, 2021

(87) PCT Pub. No.: WO2020/090877
PCT Pub. Date: May 7, 2020

(65) Prior Publication Data
US 2021/0323196 A1  Oct. 21, 2021

(30) Foreign Application Priority Data

Oct. 31, 2018 (JP) .............................. JP2018-205381

(51) Int. Cl.
*B29B 11/16* (2006.01)
*B29K 105/12* (2006.01)
*B29K 101/10* (2006.01)

(52) U.S. Cl.
CPC .......... *B29B 11/16* (2013.01); *B29K 2101/10* (2013.01); *B29K 2105/12* (2013.01)

(58) Field of Classification Search
CPC ......... B29C 70/08; B29C 70/10; B29C 70/12; B29C 70/14; B29C 70/18; B29K 2105/12; C08J 5/042; B29B 11/16
See application file for complete search history.

(56) References Cited

U.S. PATENT DOCUMENTS

| 5,108,678 A | 4/1992 | Hirasaka et al. |
| 5,537,718 A | 7/1996 | Nagatsuka et al. |

(Continued)

FOREIGN PATENT DOCUMENTS

| JP | 50-108372 | 8/1975 |
| JP | 58-8733 | 1/1983 |

(Continued)

OTHER PUBLICATIONS

Espacenet translation of JP-2009062474-A. (Year: 2009).*

*Primary Examiner* — Jeremy R Pierce
*Assistant Examiner* — Christine X Nisula
(74) *Attorney, Agent, or Firm* — DLA Piper LLP (US)

(57) ABSTRACT

A fiber-reinforced resin molding material [C] includes a chopped fiber bundle [A] and a matrix resin [B], the material being characterized in that, when divided into n layers along the thickness direction of the fiber-reinforced resin molding material [C], the number-average fiber length [Lk] of the chopped fiber bundle [Ak] constituting each layer Fk (1≤k≤n) gradually increases from one outermost layer F1 of the fiber-reinforced resin molding material [C] toward the other outermost layer Fn. Also provided is a molded article obtained by molding the fiber-reinforced resin molding material. This fiber-reinforced resin molding material exhibits excellent flowability, and can exhibit excellent mechanical properties when made into a molded article.

18 Claims, 4 Drawing Sheets

(56) References Cited

U.S. PATENT DOCUMENTS

| | | |
|---|---|---|
| 2015/0044455 A1 | 2/2015 | Konagai et al. |
| 2015/0292145 A1 | 10/2015 | Sonoda et al. |
| 2019/0016088 A1 | 1/2019 | Maeda et al. |
| 2020/0346441 A1 * | 11/2020 | Seike ................ B32B 27/12 |

FOREIGN PATENT DOCUMENTS

| | | |
|---|---|---|
| JP | H03-47740 | 2/1991 |
| JP | 5-309752 | 11/1993 |
| JP | 8-197541 | 8/1996 |
| JP | 2009-62648 | 3/2009 |
| JP | 2009062474 A * | 3/2009 |
| JP | 2013-216767 | 10/2013 |
| JP | 2014-40088 | 3/2014 |
| WO | 2014/208626 | 12/2014 |
| WO | 2017/164157 | 9/2017 |
| WO | WO-2018143068 A1 * | 8/2018 ............ B29C 70/08 |

\* cited by examiner

FIBER-REINFORCED RESIN MOLDING MATERIAL AND MOLDED ARTICLE THEREOF

TECHNICAL FIELD

This disclosure relates to a fiber-reinforced resin molding material obtained by impregnating chopped fiber bundles prepared by cutting and depositing a fiber bundle of continuous reinforcing fibers with a matrix resin, and a molded article thereof.

BACKGROUND

A technology is known wherein using a fiber-reinforced resin molding material comprising a sheet composed of chopped fiber bundles obtained by randomly dispersing chopped fiber bundles of discontinuous reinforcing fibers prepared by cutting a fiber bundle of continuous reinforcing fibers and a matrix resin, a fiber-reinforced plastic having a complicated shape such as a three-dimensional shape is molded by heating/pressurizing molding. Such a molding technology includes a sheet molding compound (hereinafter, called as SMC).

A molded article using a fiber-reinforced resin molding material such as SMC is obtained by heating and pressurizing an SMC sheet prepared by impregnating a matrix resin, which is a thermosetting resin, into a sheet comprising chopped fiber bundles cut to a desired length using a heating type press machine. Many times, because the SMC sheet is cut smaller than the molded body before pressurization to be placed in a mold, and the SMC sheet is made to flow into the shape of the molded body by pressurization to perform molding, even a complicated shape such as a three-dimensional shape can be made. However, in the sheet forming process of the SMC sheet, when the flowability of the chopped fiber bundles is poor since the fiber bundle may be bent or unevenness in orientation may be caused, there is a problem of decrease or increase of variation of mechanical properties.

To solve such a problem, disclosed is a method of producing an SMC sheet exhibiting excellent mechanical properties by controlling the shape of reinforcing fibers such as fiber length of reinforcing fibers, fiber bundle thickness, fiber bundle width and the like (WO 2017/164157 pamphlet, WO 2014/208626 pamphlet and JP-A-2014-40088). Further, disclosed is a method of producing an SMC sheet exhibiting excellent mechanical properties by controlling the number of fibers constituting the fiber bundle (JP-A-HEI 3-47740).

In WO 2017/164157 pamphlet, WO 2014/208626 pamphlet and JP-A-2014-40088, a fiber-reinforced resin molding material and a reinforcing fiber sheet defined with average values of the fiber length of the reinforcing fibers, fiber bundle thickness and fiber bundle width is disclosed. However, the fiber bundle shape and the layer structure in the thickness direction of the fiber-reinforced resin molding material or the reinforcing fiber sheet are not specified in detail, and there is a room for improvement in flowability during molding and mechanical properties of the molded article.

In JP-A-HEI 3-47740, disclosed is a fiber-reinforced plastic sheet having a structure in which discontinuous reinforcing fibers change from a fiber layer having a larger number of fibers to be bundled to a fiber layer having a smaller number of fibers to be bundled in a matrix resin. However, the structure of the layer is not described in detail, and in addition, since the fiber length of the reinforcing fibers, the fiber bundle thickness and the fiber bundle width are not specified, there is a room for improvement in flowability during molding and mechanical properties of the molded article. Furthermore, because the reinforcing fibers contain monofilaments positively, there are such problems that the bending and aggregation of the fibers at the time of molding are liable to occur, the reinforcement is insufficient, the variation becomes larger, and because the monofilaments are easy to float, the workability is poor, and a short circuit of an electric equipment is likely to occur.

It could therefore be helpful to provide a fiber-reinforced resin molding material that exhibits excellent flowability during molding and excellent mechanical properties when formed into a molded article by controlling a fiber bundle shape included in a fiber-reinforced resin molding material and a layer structure along the thickness direction of the fiber-reinforced resin molding material, and a molded article thereof.

SUMMARY

We thus provide:

[1] A fiber-reinforced resin molding material [C] including a chopped fiber bundle [A] and a matrix resin [B], characterized in that, when divided into n layers along a thickness direction of the fiber-reinforced resin molding material [C], a number-average fiber length [Lk] of a chopped fiber bundle [Ak] constituting each layer Fk ($1 \leq k \leq n$) gradually increases from one outermost layer F1 of the fiber-reinforced resin molding material [C] toward the other outermost layer Fn.

[2] The fiber-reinforced resin molding material according to [1], wherein, when divided into n layers along the thickness direction of the fiber-reinforced resin molding material [C], a number-average fiber bundle thickness [Tk] of the chopped fiber bundle [Ak] constituting each layer Fk gradually increases from one outermost layer F1 of the fiber-reinforced resin molding material [C] toward the other outermost layer Fn.

[3] The fiber-reinforced resin molding material according to [1] or [2], wherein, when divided into n layers along the thickness direction of the fiber-reinforced resin molding material [C], a number-average fiber bundle width [Wk] of the chopped fiber bundle [Ak] constituting each layer Fk gradually increases from one outermost layer F1 of the fiber-reinforced resin molding material [C] toward the other outermost layer Fn.

[4] The fiber-reinforced resin molding material according to any one of [1] to [3], wherein a number-average fiber length [L1] of a chopped fiber bundle [A1] constituting one outermost layer F1 and a number-average fiber length [Ln] of a chopped fiber bundle [An] constituting the other outermost layer Fn satisfy equation (1).

$$1.01 < Ln/L1 \leq 1.5 \qquad (1)$$

[5] The fiber-reinforced resin molding material according to any one of [1] to [4], wherein a number-average fiber bundle thickness [T1] of a chopped fiber bundle [A1] constituting one outermost layer F1 and a number-average fiber bundle thickness [Tn] of a chopped fiber bundle [An] constituting the other outermost layer Fn satisfy equation (2).

$$1.01 < Tn/T1 \leq 2.0 \qquad (2)$$

[6] The fiber-reinforced resin molding material according to any one of [1] to [5], wherein a number-average fiber bundle width [W1] of a chopped fiber bundle [A1] constituting one outermost layer F1 and a number-average fiber bundle width [Wn] of a chopped fiber bundle [An] constituting the other outermost layer Fn satisfy equation (3).

$$1.01 < Wn/W1 \leq 1.6 \qquad (3)$$

[7] The fiber-reinforced resin molding material according to any one of [1] to [6], claims 1 to 6, wherein a number-average fiber length [L] of the chopped fiber bundle [A] is in a range of 3 mm or more and 100 mm or less.

[8] The fiber-reinforced resin molding material according to any one of [1] to [7], wherein a number-average fiber bundle thickness [T] of the chopped fiber bundle [A] is in a range of 0.01 mm or more and 0.4 mm or less.

[9] The fiber-reinforced resin molding material according to any one of [1] to [8], wherein a number-average fiber bundle width [W] of the chopped fiber bundle [A] is in a range of 0.5 mm or more and 60 mm or less.

[10] The fiber-reinforced resin molding material according to any one of [1] to [9], wherein a number-average cut angle θ of the chopped fiber bundle [A] is in a range of 0°<θ<90°.

[11] The fiber-reinforced resin molding material according to any one of [1] to [10], wherein the matrix resin [B] is a thermosetting resin.

[12] The fiber-reinforced resin molding material according to any one of [1] to [11], wherein the number n of the divided layers is n≥3.

[13] A molded article obtained by molding a fiber-reinforced resin molding material according to any one of [1] to [12].

According to the fiber-reinforced resin molding material, excellent flowability at the time of molding and excellent mechanical properties when formed into a molded article can be exhibited.

EXPLANATION OF SYMBOLS

Figure 1:
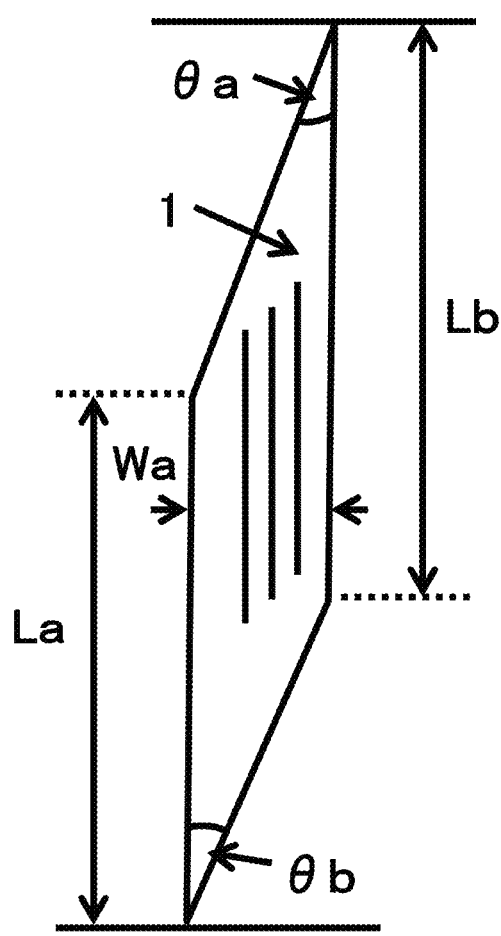
FIG. 1 is a two-dimensional plane projection diagram showing an example of a chopped fiber bundle, and showing measurement places of fiber length, fiber bundle width and acute angles θa and θb of tip angles of the chopped fiber bundle [A].

1: chopped fiber bundle [A]
2: bobbin
3: Continuous reinforcing fiber bundle
4: nip roll
5: cutting machine
6: distributor
7: baffle plate
8: chopped fiber bundle precursor [a]
9: chopped fiber bundle [A]
10: first resin bath
11: first sheet roll
12: first carrier sheet
13: first resin sheet
14: aggregate comprising chopped fiber bundles [A]
15: first conveyor
16: second sheet roll
17: second carrier sheet
18: second conveyor
19: second resin bath
20: second resin sheet
21: fiber-reinforced resin molding material precursor
22: pressurizing mechanism
23: fiber-reinforced resin molding material [C]
24: rotational shaft
25: wire
26: scattering tower

DETAILED DESCRIPTION

Hereinafter, our materials, molded articles and methods, and examples thereof, will be explained in detail.

Our fiber-reinforced resin molding material comprises a chopped fiber bundle [A] and a matrix resin [B], and is characterized in that, when divided into n layers along a thickness direction of the fiber-reinforced resin molding material [C], a number-average fiber length [Lk] of a chopped fiber bundle [Ak] constituting each layer Fk (1≤k≤n) gradually increases from one outermost layer F1 of the fiber-reinforced resin molding material [C] toward the other outermost layer Fn.

The chopped fiber bundle [A] is a fiber bundle obtained by cutting a continuous reinforcing fiber bundle comprising a large number of filaments arranged in one direction at a constant interval in the longitudinal direction of the fiber.

As the chopped fiber bundle [A], reinforcing fibers, for example, organic fibers such as aramid fibers, polyethylene fibers and polyparaphenylene benzoxazole (PBO) fibers, inorganic fibers such as glass fibers, carbon fibers, silicon carbide fibers, alumina fibers, tyranno fibers, basalt fibers and ceramic fibers, and metal fibers such as stainless fibers and steel fibers, and other fibers such as boron fibers, natural fibers, modified natural fibers, can be exemplified as fibers used for the fiber bundle. Among them, carbon fibers (especially, PAN (polyacrylic nitrile)-based carbon fibers) are preferred, because they are light in weight among these reinforcing fibers, have particularly excellent properties in specific strength and specific modulus of elasticity, and further, are excellent in heat resistance and chemical resistance.

As the matrix resin [B], a thermosetting resin and a thermoplastic resin can be used. As the resin, only the thermosetting resin may be used, only the thermoplastic resin may be used, and both the thermosetting resin and the thermoplastic resin may be used.

As the thermosetting resin, for example, thermosetting resins such as an epoxy resin, an unsaturated polyester resin, a vinyl ester resin, a phenolic resin, an epoxy acrylate resin, a phenoxy resin, an alkyd resin, an urethane resin, a maleimide resin and a cyanate resin can be exemplified. In particular, the use of an epoxy resin, an unsaturated polyester resin and a vinyl ester resin is preferable because they exhibit excellent interfacial adhesion to reinforcing fibers. As the thermosetting resin, one kind of the resin may be used alone, or two or more kinds may be used in combination.

As the thermoplastic resin, for example, a polyolefin-based resin such as a polyethylene resin or a polypropylene resin, a polyamide-based resin such as a nylon 6 resin or a nylon 6,6 resin, a polyester-based resin such as a polyethylene terephthalate resin or a polybutylene terephthalate resin, a polyphenylene sulfide resin, a polyether ketone resin, a polyether sulfone resin, an aromatic polyamide resin, or the like can be exemplified. As the thermoplastic resin, one kind of the resin may be used alone, or two or more kinds may be used in combination.

Further, an additive such as a curing agent, an internal release agent, a thickener and a stabilizer may be added to the matrix resin as needed.

The fiber-reinforced resin molding material [C] is obtained by impregnating the chopped fiber bundle [A] with the matrix resin [B]. In particular, one using a thermosetting resin as the matrix resin [B] is called an SMC (sheet molding compound), and it can be used as an intermediate material for a molded article.

The weight content of the chopped fiber bundle [A] in the fiber-reinforced resin molding material [C] is preferably 20 wt % or more and 75 wt % or less relative to the total weight of the fiber-reinforced resin molding material [C], more preferably 30-70 wt %, and further preferably 40-70 wt %. If the weight content of the chopped fiber bundle [A] is equal to or greater than the lower limit, a fiber-reinforced resin material molded article having excellent mechanical properties is easily obtained. If the weight content of the chopped fiber bundle [A] is equal to or less than the upper limit, the flow resistance at the time of molding is small, and the variation of flowability and the bending and orientation unevenness of the chopped fiber bundle [A] can be reduced.

When the fiber-reinforced resin molding material [C] is molded, the flow resistance is different between the initial stage of molding and the later stage of the molding, and by this change of the flow resistance, the bending and orientation unevenness of the chopped fiber bundle [A] are generated, and the mechanical properties decrease. In particular, when a thermosetting resin is used as the matrix resin [B], when the fiber-reinforced resin molding material [C] is heated and pressurized using a heating-type press machine, generally, the outermost layer part of the fiber-reinforced resin molding material [C] in contact with the high-temperature mold surface is likely to be easily fluidized by lowering of the flow resistance due to the reduction of the viscosity of the matrix resin [B], but because the curing of the resin is started from the outermost layer, in the later stage of the molding in which the curing of the matrix resin [B] begins, the outermost layer part increases in flow resistance by the increase in viscosity, and it becomes difficult to flow. Namely, since the flow resistance at each position in the thickness direction is different by the occurrence of a time difference in the transmission of the heat in the thickness direction of the fiber-reinforced resin molding material [C], by this change of the flow resistance, the bending and orientation unevenness of the chopped fiber bundle [A] are generated, and the mechanical properties are reduced.

Accordingly, by providing a plurality of layers Fk different in number-average fiber length [Lk], number-average fiber bundle thickness [Tk] and number-average fiber bundle width [Wk] of chopped fiber bundle [Ak] in the thickness direction of the fiber-reinforced resin molding material [C], a plurality of layers having different flowability in the thickness direction are made, and variation in flow resistance during molding is dispersed, thereby suppressing decrease of mechanical properties.

Since the number-average fiber length [Lk] of the chopped fiber bundle [Ak] constituting each layer of the fiber-reinforced resin molding material [C], preferably, the number-average fiber length [Lk] and the number-average fiber bundle thickness [Tk], more preferably the number-average fiber length [Lk], the number-average fiber bundle thickness [Tk] and the number-average fiber bundle width [Wk] gradually increase from one outermost layer F1 toward the other outermost layer Fn, a layer closer to the outermost layer Fn has a larger flow resistance. On the other hand, if the outermost layer Fn is arranged to be brought into contact with the lower mold of the heating mold at the time of heating and pressurizing, because the outermost layer Fn is heated by the lower die until the upper mold comes into contact with the outermost layer F1, the viscosity of the matrix resin [B] of a layer closer to the outermost layer Fn becomes lower, and the resin is in a state easy to flow. Therefore, by the mutual action of the flowability of the matrix resin [B] of each layer and the above-described magnitude of the flow resistance by the chopped fiber bundle [Ak], the difference in flow state between the respective layers becomes smaller, and the bending and orientation unevenness of the chopped fiber bundle [A] can be reduced.

Further, when resin is supplied only from the outermost layer F1 when impregnating the chopped fiber bundle [A] with the matrix resin [B], the matrix resin [B] easily flows in one direction in the thickness direction of the fiber-reinforced resin molding material [C], and impregnation of the matrix resin [B] into the chopped fiber bundle [A] is promoted.

When the resin is supplied from each outermost layer at the time of impregnation, since the speed at which the resin moves from the outermost layer Fn in the thickness direction is larger than the speed at which the resin moves from the outermost layer F1 in the thickness direction, when the resins supplied from the respective outermost layers are joined near the central portion in the thickness direction, the movement of the resin supplied from the outermost layer Fn is approximately completed, and the moving speed of the resin is lowered. Therefore, since the joining speed of the resins supplied from the respective outermost layers becomes gentle, air in the chopped fiber bundle [A] and between the chopped fiber bundles [A] easily comes off to the outside, and the impregnation state becomes good.

The fiber length of the chopped fiber bundle [A] is a length in the direction along the fiber direction of the chopped fiber bundle [A], and the bundle thickness of the chopped fiber bundle [A] is a minor axis of a cross section perpendicular to the fiber direction of the chopped fiber bundle [A], and the bundle width of the chopped fiber bundle [A] is a major axis of a cross section perpendicular to the fiber direction of the chopped fiber bundle [A].

Further, "dividing into n layers" means to heat the fiber-reinforced resin molding material [C] in an electric furnace to decompose the matrix resin [B], and divide the sheet composed of the remaining chopped fiber bundles [A] into n pieces (n layers) in the thickness direction, and one among the layers divided into n pieces in the thickness direction is referred to as one layer. n is an integer of n≥2.

Although the method of decomposing the matrix resin [B] and dividing the sheet composed of the remaining chopped fiber bundle [A] into layers of n pieces in the thickness direction is not particularly limited, it is preferred to divide the sheet composed of the remaining chopped fiber bundles [A] into layers of n pieces in the thickness direction so that the weight of each layer is uniform.

"Uniform" means that the weight of each of the sheets composed of the remaining chopped fiber bundles [A] divided into n layers is within ±5% of the average value of the weight of each of the sheets composed of the remaining chopped fiber bundles [A].

The outermost layer means a layer located outermost in the thickness direction of the fiber-reinforced resin molding material [C], and the central layer means a layer existing between the two outermost layers.

The measurements of the fiber length, the bundle thickness and the bundle width of the chopped fiber bundle [A] are performed by heating the fiber-reinforced resin molding material [C] in an electric furnace to decompose and remove the matrix resin [B], and then sampling the chopped fiber bundle [A] from the sheet composed of the remaining chopped fiber bundle [A]. Concrete measurement methods of the fiber length, the bundle thickness and the bundle width will be described later.

In the fiber-reinforced resin molding material [C], it is important to have a structure that, when divided into n layers along a thickness direction of the fiber-reinforced resin molding material [C], a number-average fiber length [Lk] of a chopped fiber bundle [Ak] constituting each layer Fk gradually increases from one outermost layer F1 of the fiber-reinforced resin molding material [C] toward the other outermost layer Fn. k is an integer of 1≤k≤n. In such a layer structure, flowability during molding is improved, flowability unevenness and the bending and orientation unevenness of the chopped fiber bundle [A] can be reduced. Further, when the resin is supplied only from the outermost layer F1 at the time of impregnation, the matrix resin [B] easily flows in one direction in the thickness direction of the fiber-reinforced resin molding material [C], and impregnation of the matrix resin [B] into the chopped fiber bundle [A] is promoted. When the resin is supplied from each outermost layer at the time of impregnation, since the joining speed of the resins supplied from the respective outermost layers becomes gentle, air in the chopped fiber bundle [A] and between the chopped fiber bundles [A] easily comes off to the outside, and the impregnation state becomes good. Further, the division number n is preferably any of 2≤n≤7, more preferably 2≤n≤5, and further preferably n=3. In this instance, the aforementioned improvement effect is great, and a molded article having excellent mechanical properties can be obtained.

The fiber-reinforced resin molding material [C] preferably has a structure wherein, when divided into n layers along the thickness direction of the fiber-reinforced resin molding material [C], a number-average fiber bundle thickness [Tk] of the chopped fiber bundle [Ak] constituting each layer Fk gradually increases from one outermost layer F1 of the fiber-reinforced resin molding material [C] toward the other outermost layer Fn. In such a layer structure, flowability during molding is improved, flowability unevenness and the bending and orientation unevenness of the chopped fiber bundle [A] can be reduced. Further, when the resin is supplied only from the outermost layer F1 at the time of impregnation, the matrix resin [B] easily flows in one direction in the thickness direction of the fiber-reinforced resin molding material [C], and impregnation of the matrix resin [B] into the chopped fiber bundle [A] is promoted. When the resin is supplied from each outermost layer at the time of impregnation, since the joining speed of the resins supplied from the respective outermost layers becomes gentle, air in the chopped fiber bundle [A] and between the chopped fiber bundles [A] easily comes off to the outside, and the impregnation state becomes good. Further, the division number n is preferably any of 2≤n≤7, more preferably 2≤n≤5, and further preferably n=3. In this example, the aforementioned improvement effect is great, and a molded article having excellent mechanical properties can be obtained.

The fiber-reinforced resin molding material [C] preferably has a structure wherein, when divided into n layers along the thickness direction of the fiber-reinforced resin molding material [C], a number-average fiber bundle width [Wk] of the chopped fiber bundle [Ak] constituting each layer Fk gradually increases from one outermost layer F1 of the fiber-reinforced resin molding material [C] toward the other outermost layer Fn. In such a layer structure, flowability during molding is improved, flowability unevenness and the bending and orientation unevenness of the chopped fiber bundle [A] can be reduced. Further, when the resin is supplied only from the outermost layer F1 at the time of impregnation, the matrix resin [B] easily flows in one direction in the thickness direction of the fiber-reinforced resin molding material [C], and impregnation of the matrix resin [B] into the chopped fiber bundle [A] is promoted. When the resin is supplied from each outermost layer at the time of impregnation, since the joining speed of the resins supplied from the respective outermost layers becomes gentle, air in the chopped fiber bundle [A] and between the chopped fiber bundles [A] easily comes off to the outside, and the impregnation state becomes good. Further, the division number n is preferably any of 2≤n≤7, more preferably 2≤n≤5, and further preferably n=3. In this example, the aforementioned improvement effect is great, and a molded article having excellent mechanical properties can be obtained.

"The number-average fiber length [Lk] of the chopped fiber bundle [Ak] gradually increases" means that, at least, the number-average fiber length [Ln] of the chopped fiber bundle [An] of the outermost layer Fn relative to the number-average fiber length [L1] of the chopped fiber bundle [A1] of the outermost layer F1, the ratio of Ln/L1, exceeds 1.01.

Similarly, "the number-average fiber bundle thickness [Tk] of the chopped fiber bundle [Ak] gradually increases" means that, at least, the number-average fiber bundle thickness [Tn] of the chopped fiber bundle [An] of the outermost layer Fn relative to the number-average fiber bundle thickness [T1] of the chopped fiber bundle [A1] of the outermost layer F1, the ratio of Tn/T1, exceeds 1.01, and "the number-average fiber bundle width [Wk] of the chopped fiber bundle [Ak] gradually increases" means that, at least, the number-average fiber bundle width (Wn) of the chopped fiber bundle [An] of the outermost layer Fn relative to the number-average fiber bundle width [W1] of the chopped fiber bundle [A1] of the outermost layer F1, the ratio of Wn/W1, exceeds 1.01.

In the fiber-reinforced resin molding material [C], it is preferred that the ratio Ln/L1 of the number-average fiber length [L1] of the chopped fiber bundle [A1] constituting one outermost layer F1 and the number-average fiber length [Ln] of the chopped fiber bundle [An] constituting the other outermost layer Fn satisfies 1.01≤Ln/L1≤1.5, more preferably satisfies 1.03≤Ln/L1≤1.4, further preferably satisfies 1.05≤Ln/L1≤1.3, and particularly preferably satisfies 1.10≤Ln/L1≤1.25. If Ln/L1 is within the above-described range, the resistance between layers during molding is small, the impregnation unevenness, and the bending and orientation unevenness of the chopped fiber bundle [A] can be reduced, as well as the impregnation property of the matrix resin [B] to the chopped fiber bundle [A] is improved at the time of impregnation, and a molded article having excellent mechanical properties is obtained.

The number-average fiber length [Lk] of the chopped fiber bundle [Ak] of each layer (Fk layer) is measured as follows. The fiber-reinforced resin molding material [C] is heated in an electric furnace to decompose the matrix resin [B], and the sheet composed of the remaining chopped fiber bundle [A] is divided into n layers in the thickness direction. With respect to 100 remaining chopped fiber bundles [A] randomly selected from each layer, as shown in FIG. 1, the average value of measured values at two points of La and Lb of each remaining chopped fiber bundle [A] is calculated. Next, the average of the fiber lengths of 100 remaining chopped fiber bundles [A] is defined as the number-average fiber length [Lk] of the chopped fiber bundle [Ak] in the Fk layer. Although it is preferred to measure manually by using calipers, the measurement may be performed on a computer by using an image processing software.

The measurement is performed at each layer of the two outermost layers and the central layer, among the two outermost layers, a layer having a smaller value of the number-average fiber length [Lk] is referred to as F1 and the number-average fiber length [Lk] thereof is referred to as L1, and the other layer is referred to as Fn and the number-average fiber length [Lk] thereof is referred to as Ln. When central layers are present, layers are referred to as F2, F3, . . . F(n–1) from the side closer to the F1 layer, and the number-average fiber lengths [Lk] of the respective layers are referred to as L2, L3, . . . L(n–1).

In the fiber reinforced resin molding material [C], it is preferred that the ratio Tn/T1 of the number-average fiber bundle thickness [T1] of the chopped fiber bundle [A1] constituting one outermost layer F1 and the number-average fiber bundle thickness [Tn] of the chopped fiber bundle [An] constituting the other outermost layer Fn satisfies 1.01≤Tn/T1≤2.0, more preferably satisfies 1.05≤Tn/T1≤1.8, further preferably satisfies 1.1≤Tn/T1≤1.75, and particularly preferably satisfies 1.15≤Tn/T1≤1.7. If Tn/T1 is within the above-described range, the resistance between layers during molding is small, the impregnation unevenness, and the bending and orientation unevenness of the chopped fiber bundle [A] can be reduced, as well as the impregnation property of the matrix resin [B] to the chopped fiber bundle [A] is improved at the time of impregnation, and a molded article having excellent mechanical properties is obtained.

The number-average bundle thickness [Tk] of the chopped fiber bundle [Ak] of each layer (Fk layer) is measured as follows. The fiber-reinforced resin molding material [C] is heated in an electric furnace to decompose the matrix resin [B], and the sheet composed of the remaining chopped fiber bundle [A] is divided into n layers in the thickness direction. Each of 100 remaining chopped fiber bundles [A] randomly selected from each layer is placed between an indenter having a flat surface with a diameter of 11.28 mm and a flat plane installed in parallel to the flat surface of the indenter so that a plane formed by the fiber length La and the fiber bundle width Wa of the remaining chopped fiber bundle [Ak] becomes in parallel with the flat plane, and the fiber bundle thickness is measured at a state where a load of 30 g is applied to the chopped fiber bundle by the indenter. Then, the average of the bundle thicknesses of 100 remaining chopped fiber bundles [A] is defined as the number-average bundle thickness [Tk] of the chopped fiber bundle [Ak] in the Fk layer. Further, 100 remaining chopped fiber bundles [A] to be measured may be the same as the chopped fiber bundles [A] to measure the above-described number-average fiber length [Lk].

The measurement is performed at each layer of the two outermost layers and the central layer, among the two outermost layers, a layer having a smaller value of the number-average fiber length [Lk] is referred to as F1 and the other layer is referred to as Fn, the number-average bundle thickness [Tk] of the outermost layer F1 is referred to as T1, and the number-average bundle thickness [Tk] of the outermost layer Fn is referred to as Tn. When central layers are present, layers are referred to as F2, F3, . . . F(n–1) from the side closer to the F1 layer, and the number-average bundle thicknesses [Tk] of the respective layers are referred to as T2, T3, . . . T(n–1).

In the fiber reinforced resin molding material [C], it is preferred that the ratio Wn/W1 of the number-average fiber bundle width [W1] of the chopped fiber bundle [A1] constituting one outermost layer F1 and the number-average fiber bundle width [Wn] of the chopped fiber bundle [An] constituting the other outermost layer Fn satisfies 1.01≤Wn/W1≤1.6, more preferably satisfies 1.05≤Wn/W1≤1.5, further preferably satisfies 1.1≤Wn/W1≤1.45, and particularly preferably satisfies 1.15≤Wn/W1≤1.4. If Wn/W1 is within the above-described range, the resistance between layers during molding is small, the impregnation unevenness, and the bending and orientation unevenness of the chopped fiber bundle [A] can be reduced, as well as the impregnation property of the matrix resin [B] to the chopped fiber bundle [A] is improved at the time of impregnation, and a molded article having excellent mechanical properties is obtained.

The number-average bundle width [Wk] of the chopped fiber bundle [Ak] of each layer (Fk layer) is measured as follows. The fiber-reinforced resin molding material [C] is heated in an electric furnace to decompose the matrix resin [B], and the sheet composed of the remaining chopped fiber bundle [A] is divided into n layers in the thickness direction. With respect to 100 remaining chopped fiber bundles [A] randomly selected from each layer, as shown in FIG. 1, the maximum width Wa of each remaining chopped fiber bundle [A] is measured, and the average of the bundle widths of 100 remaining chopped fiber bundles [A] is calculated as the number-average bundle width [Wk] of the chopped fiber bundle [Ak] in the Fk layer. Although it is preferred to measure manually by using calipers, the measurement may be performed on a computer by using image processing software. Further, 100 remaining chopped fiber bundles [A] to be measured may be the same as the chopped fiber bundles [A] to measure the above-described number-average fiber length [Lk].

The measurement is performed at each layer of the two outermost layers and the central layer, among the two outermost layers, a layer having a smaller value of the number-average fiber length [Lk] is referred to as F1 and the other layer is referred to as Fn, the number-average bundle width [Wk] of the outermost layer F1 is referred to as W1, and the number-average bundle width [Wk] of the outermost layer Fn is referred to as Wn. When central layers are present, layers are referred to as F2, F3, . . . F(n–1) from the side closer to the F1 layer, and the number-average bundle widths [Wk] of the respective layers are referred to as W2, W3, . . . W(n–1).

The number-average fiber length [L] of the chopped fiber bundle [A] is preferably 3 mm or more and 100 mm or less, more preferably 5 mm or more and 50 mm or less, and further preferably 5 mm or more and 30 mm or less. If the number-average fiber length [L] of the chopped fiber bundle [A] is equal to or more than the lower limit, an excellent reinforcement effect due to the chopped fiber bundle [A] is obtained, and if equal to or less than the upper limit, the bending of the chopped fiber bundle [A] is hard to occur during the flow. The number-average fiber length [L] is the average value of the number-average fiber lengths [Lk] calculated in all layers.

The number-average fiber bundle thickness [T] of the chopped fiber bundle [A] is preferably 0.01 mm or more and 0.4 mm or less, more preferably 0.02 mm or more and 0.3 mm or less, and further preferably 0.03 mm or more and 0.2 mm or less. If the number-average fiber bundle thickness [T] of the chopped fiber bundle [A] is equal to or more than the lower limit, the bending of the chopped fiber bundle [A] is hard to occur during the flow, and if equal to or less than the upper limit, the impregnation property of the resin into the chopped fiber bundle [A] is excellent. The number-average fiber bundle thickness [T] is the average value of the number-average fiber bundle thicknesses [Tk] calculated in all layers The number-average fiber bundle width [W] of the chopped fiber bundle [A] is preferably 0.5 mm or more and 60 mm or less, more preferably 0.6 mm or more and 40 mm or less, and further preferably 1.0 mm or more and 20 mm or less. If the number-average fiber bundle width [W] of the chopped fiber bundle [A] is equal to or more than the lower limit, the bending of the chopped fiber bundle [A] is hard to occur during the flow, and if equal to or less than the upper limit, the impregnation property of the resin into the chopped fiber bundle [A] is excellent. The number-average fiber bundle width [W] is the average value of the number-average fiber bundle widths [Wk] calculated in all layers Further, in the chopped fiber bundle [A], it is preferred that the number-average cut angle $\theta$ is $0°<\theta\leq90°$, more preferably $0°<\theta\leq45°$, and further preferably $5°\leq\theta\leq30°$. As shown in FIG. 1, the cut angle means a smaller angle $\theta a$, $\theta b$ among angles formed by a cutting line of the chopped fiber bundle [A] and La or Lb.

Further, the number-average cut angle $\theta$ may be a combination of any of the above-described upper limits and lower limits. Since the cutting angle of the chopped fiber bundle [A] is an oblique direction and stress is hardly concentrated at an end portion of the chopped fiber bundle [A] when made into a molded product, the mechanical properties are improved.

The number-average cut angle of the chopped fiber bundle [A] is measured as follows. The fiber-reinforced resin molding material [C] is heated in an electric furnace to decompose the matrix resin [B], and 100 remaining chopped fiber bundles [A] randomly selected from the sheet consisting of the remaining chopped fiber bundles [A] are measured, and as shown in FIG. 1, the angles ($\theta a$, $\theta b$) on both sides of the end portions of each of the remaining chopped fiber bundles [A] are measured. This measurement is performed for 100 remaining chopped fiber bundles [A], and the average of the cut angles totally at 200 points is defined as the number-average cut angle $\theta$ of the chopped fiber bundle [A]. Although it is preferred to perform the measurement manually by using a protractor, it may be measured on a computer by using an image processing software.

It is preferred that the chopped fiber bundles [A] are oriented substantially at random. The "oriented substantially at random" means that when the orientations when the chopped fiber bundles [A] are scattered are divided into four directions each having a 45° angle within the direction of $-90°\leq\theta<90°$ at a state being started from an arbitrary direction ($-90°\leq\theta<-45°$, $-45°\leq\theta<0°$, $0°\leq\theta<45°$, $45°\leq\theta<90°$), the rate of the fiber bundles oriented in each direction relative to the whole fiber bundles is relatively uniformly distributed within 25±2.5%. By the condition where the chopped fiber bundles [A] are oriented substantially at random since the fiber-reinforced resin molding material [C] obtained by impregnating the chopped fiber bundle [A] with the matrix resin [B] can be handled as an isotropic material, the design for molding a molded article using the fiber-reinforced resin molding material [C] is facilitated.

The fiber orientation of the chopped fiber bundle [A] is determined as follows. First, the fiber reinforced resin molding material [C] is heated in an electric furnace to decompose the matrix resin [B], and the image sliced in the mat thickness direction is photographed from the sheet consisting of the remaining chopped fiber bundle [A] so that all remaining chopped fiber bundles [A] appear in the sheet thickness direction. As the method of photographing the sliced image, though it is not particularly restricted, a method wherein transferring of the remaining chopped fiber bundles [A] to a medium is repeatedly performed in the mat thickness direction while maintaining the orientations of the chopped fiber bundles [A], and the image after the transfer is photographed, and the like, can be exemplified. "All remaining chopped fiber bundles [A]" indicates 90% or more of chopped fiber bundles [A] present within the range to be determined.

Next, the fiber longitudinal direction (angle) of each remaining chopped fiber bundle [A] is measured from the obtained image. The measurement of the fiber longitudinal direction (angle) may be performed on a computer by using an image processing software, and although a time is required, manual measurement by using a protractor may be performed. A histogram is prepared from the obtained values of the fiber longitudinal directions (angles) and it is arranged in a four-direction distribution. The area of the mat to be measured is set to 10,000 mm$^2$ or more.

Although the number of filaments constituting the chopped fiber bundle [A] is not particularly limited, it is preferred that the ratio of chopped fiber bundles [A] composed of 100 filaments or more is 85% or more in number average relative to the whole of chopped fiber bundles [A], more preferably 90% or more, further preferably 95% or more, and particularly preferably 98% or more.

Further, it is preferred that the number-average filament number of the chopped fiber bundle [A] is 500 or more and less than 12,000.

When the number of filaments constituting the chopped fiber bundle [A] is smaller than the above-described lower limit, in a processing process until made into a molded article, the chopped fiber bundle [A] is bent with respect to the fiber longitudinal direction, the straightness of the fiber is lost, and the reinforcement effect by the reinforcing fibers when formed into a molded article is not sufficiently obtained, that is, the desired mechanical properties may not be exhibited. Further, when the number of filaments constituting the chopped fiber bundle [A] is larger than the above-described upper limit, stress concentration is easily generated at the end portion of the chopped fiber bundle [A] when formed into a molded article, and variation in mechanical properties may be increased.

The number of filaments of the chopped fiber bundle [A] of each layer is measured as follows. The fiber-reinforced resin molding material [C] is heated in an electric furnace to decompose the matrix resin [B], and with respect to each of 100 remaining chopped fiber bundles [A] randomly selected from the sheet consisting of the remaining chopped fiber bundles [A], the weight is measured together with the fiber length.

The fiber length measurement of each chopped fiber bundle [A] is performed as follows. The fiber-reinforced resin molding material [C] is heated in an electric furnace to decompose the matrix resin [B], and with respect to 100 remaining chopped fiber bundles [A] randomly selected from the sheet consisting of the remaining chopped fiber bundles [A] are measured, as shown in FIG. 1, the average value of the values measured at two points of La and Lb of each remaining chopped fiber bundle [A] is calculated as a fiber length, and the weight of the chopped fiber bundle [A] is measured with an electronic balance with an accuracy of 0.01 mg. From the calculated fiber length of the chopped fiber bundle [A] and the specific gravity (nominal value) of the reinforcing fiber to be used and the fiber diameter (nominal value), the weight per one fiber is calculated by regarding the fiber shape as a column ((fiber diameter/2)$^2$× fiber length×specific gravity), the number of filaments of the remaining chopped fiber bundle [A] is calculated by dividing the weight of the chopped fiber bundle [A] with the calculated weight per one fiber, and the calculated value is defined as the number of filaments of the chopped fiber bundle [A]. Further, the average of the numbers of filaments of 100 remaining chopped fiber bundles [A] is defined as the number-average filament number of the chopped fiber bundle [A].

Although it is preferred that the fiber length of the chopped fiber bundle [A] is measured manually by using calipers, the measurement may be performed on a computer by using an image processing software.

It is preferred that the sheet comprising the chopped fiber bundle [A] has a fiber amount E per unit area (areal weight of the chopped fiber bundle [A]) of 50 g/m$^2$ or more and 5,000 g/m$^2$ or less. If the areal weight of the chopped fiber bundle [A] exceeds 5,000 g/m$^2$, when a molded article having a thickness of several millimeters to several centimeters is obtained, the ranges of conditions of manufacturing sheet comprising the chopped fiber bundle [A] and the fiber-reinforced resin molding material [C] are limited, and it becomes difficult to obtain them with a good productivity. Further, when the matrix resin [B] is impregnated into the chopped fiber bundle [A] to obtain the fiber-reinforced resin molding material [C], because the sheet thickness is inevitably increased, an insufficient impregnation of the matrix resin [B] may occur, a fiber-reinforced resin molding material [C] and a molded article using the fiber-reinforced resin molding material [C], having a stable quality, may not be obtained. On the other hand, if the areal weight of the chopped fiber bundle [A] is less than 50 g/m$^2$, when a molded article having a thickness of several millimeters to several centimeters is obtained, because it is necessary to mold it by stacking a large number of fiber-reinforced resin molding materials [C], it becomes difficult to obtain it with a good productivity.

In the sheet comprising the chopped fiber bundle [A], it is preferred that the variation coefficient of the fiber amount E per unit area (areal weight of the chopped fiber bundle [A]) is 20% or less To obtain the fiber-reinforced resin molding material [C] with a good productivity, it is preferred that the variation coefficient of the areal weight of the chopped fiber bundle [A] is small and, also, to exhibit excellent mechanical properties when made into a molded article, the variation coefficient is preferably small. The variation coefficient of the areal weight of the chopped fiber bundle [A] is further preferably 10% or less.

The variation coefficient is represented as a value (%) obtained by dividing the standard deviation of the areal weight of the chopped fiber bundle [A] with the average value of the areal weight of the chopped fiber bundle [A]. It is evaluated from measurement results at six positions randomly selected from a sheet comprising the same chopped fiber bundle [A].

Further, it is preferred that the molding method of the fiber-reinforced resin molding material [C] is a compression molding. The fiber-reinforced resin molding material [C] has excellent flowability and impregnation property, suppresses a change in flow resistance generated during compression molding, and a molded article having excellent mechanical properties can be obtained. The method of molding the fiber-reinforced resin molding material [C] will be described later.

The fiber-reinforced resin molding material [C] may be used alone or a plurality of fiber-reinforced resin molding materials [C] may be used by being stacked. Even when a plurality of fiber-reinforced resin molding materials [C] are used by being stacked, by dispersing the change in flow resistance during molding near the outermost layer, to reduce the bending and orientation unevenness of the chopped fiber bundle [A] can be reduced. Further, when the fiber-reinforced resin molding materials [C] are stacked, higher mechanical properties can be exhibited by stacking the outermost layer F1 and the outermost layer Fn in contact with each other. When a plurality of fiber-reinforced resin molding materials [C] are used at a condition being stacked, generally, although the mechanical properties of a portion near the stacking interface of the fiber-reinforced resin molding materials [C] are reduced because such a portion becomes a resin-rich state, when the outermost layer F1 and the outermost layer Fn are stacked in contact with each other, since the flowabilities are greatly different between the outermost layer F1 and the outermost layer Fn, the stacking interface between the fiber-reinforced resin molding materials [C] is disturbed at the time of molding, and the resin-rich state of the interface is eliminated and, therefore, a molded article having excellent mechanical properties can be obtained. Furthermore, the flow of the matrix resin [B] with respect to the thickness direction of the fiber-reinforced resin molding material [C] can be controlled at the time of impregnation, impregnation of the matrix resin [B] into the chopped fiber bundle [A] is promoted, and a molded article having excellent mechanical properties can be obtained.

A method of producing a fiber-reinforced resin molding material [C] includes the following steps. Hereinafter, although the production method is explained with reference to the apparatus shown in FIG. 2, our methods are not limited to this figure.

First, a first carrier sheet 12 is drawn out from a first sheet roll 11 and supplied to a first conveyor 15, and a paste of the matrix resin [B] from a first resin bath 10 is applied by a doctor blade at a predetermined thickness to form a first resin sheet 13. The first resin sheet 13 travels at a constant speed by the first conveyor 15.

Continuous reinforcing fiber bundles 3 are drawn out from bobbin 2, after through a nip roll 4, they are continuously cut at a cutting machine 5 to have a predetermined length to form chopped fiber bundle precursors [a] 8 (chopped fiber bundle precursor [a] production step), and then, the chopped fiber bundle precursors [a] 8 are allowed to collide with a distributor 6 as they are to generate one or a plurality of chopped fiber bundles [A] 9, and the chopped fiber bundles [A] 9 are scattered onto the first resin sheet 13 (chopped fiber bundle [A] scattering step). By this, an aggregate 14 comprising chopped fiber bundles [A] in which chopped fiber bundles [A] 9 are randomly scattered is continuously formed on the traveling first resin sheet 13. A baffle plate 7 may be provided on the downstream side in the conveying direction as needed.

Further, on the downstream side of the first resin sheet 13 on which the aggregate 14 comprising the chopped fiber bundles [A] is formed, a long second carrier sheet 17 is drawn out from a second sheet roll 16, and a second resin sheet 20 in which the paste of the matrix resin [B] from a second resin bath 19 is applied onto the surface of the second carrier sheet 17 with a predetermined thickness is formed. The second resin sheet 20 travels at a constant speed by a second conveyor 18, and the second resin sheet 20 is laminated and stacked so that the upper surface of the aggregate 14 comprising the chopped fiber bundles [A] and the surface applied with the paste of the matrix resin [B] are brought into contact with each other (lamination step). In this lamination step, a fiber-reinforced resin molding material precursor 21 partially impregnated with the matrix resin [B] applied to the first resin sheet 13 and the second resin sheet 20 is continuously formed in the aggregate 14 comprising the chopped fiber bundles [A].

Next, the fiber-reinforced resin molding material precursor 21 sandwiched between the first resin sheet 13 and the second resin sheet 20 is pressurized from both surfaces by a pressurizing mechanism 22, the matrix resin [B] applied to the first resin sheet 13 and the second resin sheet 20 is impregnated into the aggregate 14 comprising chopped fiber bundles [A] (impregnation step), and a fiber-reinforced resin molding material [C] 23 is formed between the first carrier sheet 12 and the second carrier sheet 17. The fiber-reinforced resin molding material [C] 23 is wound in a roll form together with the first carrier sheet 12 and the second carrier sheet 17.

In the production process of the chopped fiber bundle precursor [a], the continuous reinforcing fiber bundle 3 drawn out from the bobbin 2 is not drawn out in a completely uniform shape in the width direction and in the longitudinal direction, and may be twisted. Therefore, the chopped fiber bundle precursor [a] 8 obtained by cutting the continuous reinforcing fiber bundle 3 by the cutting machine 5 is not uniform in fiber bundle thickness, width and number of filaments. Further, before the continuous reinforcing fiber bundle 3 is supplied to the cutting machine 5, a widening treatment or a separation treatment can be performed, and these treatments can also be used in combination. Although the fiber bundle thickness can be leveled by performing the widening treatment or the fiber bundle width can be leveled by performing the separation treatment, because the continuous reinforcing fiber bundle 3 itself is not in a completely uniform shape as described above, the chopped fiber bundle precursor [a] 8 cut by the cutting machine 5 is not uniform in fiber bundle thickness, width and filament number.

As the method of cutting the continuous reinforcing fiber bundle 3 at a predetermined angle, although it is not particularly limited, a method for supplying the continuous reinforcing fiber bundle 3 at a predetermined angle to the fixed cutting machine 5 and a method for arranging the cutting machine 5 at a predetermined angle with respect to the traveling direction of the continuous reinforcing fiber bundle 3 supplied from the nip roll 4 can be exemplified.

As the cutting machine 5, it is not particularly restricted, and a guillotine blade type or a rotary cutter type can be exemplified. Moreover, the method of cutting the continuous reinforcing fiber bundle 3 at a predetermined angle may be a method of controlling the direction of the blade or the like.

The method of obtaining the chopped fiber bundles [A] having different fiber lengths is not particularly limited, but exemplified are a method of obtaining discontinuous reinforcing fiber bundles by installing a plurality of cutting machines 5 so that the fiber lengths are different from each other, a method for adjusting the cutting interval (altering the cutting speed) of the cutting machine 5, a method for adjusting the feeding speed of the continuous reinforcing fiber bundle 3 to the cutting machine 5, a method of changing the pitch of the cutting blade of the cutting machine 5 and the like.

Figure 3:
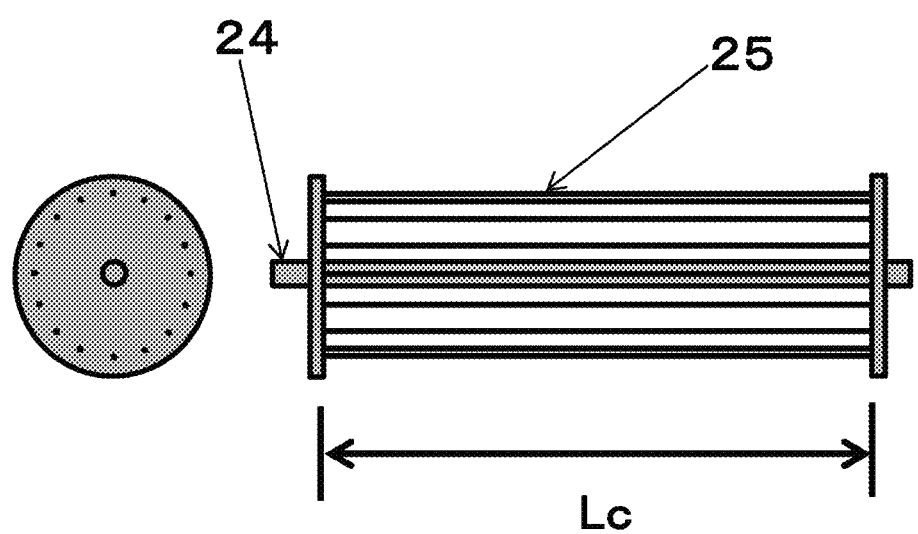
FIG. 3 is a schematic diagram of a distributor used in our method.

The chopped fiber bundle precursor [a] 8 becomes one or a plurality of chopped fiber bundles [A] by colliding with the distributor 6, and the chopped fiber bundles [A] are scattered on the first resin sheet 13. The shape of the distributor 6 is not particularly limited, but as shown in FIG. 3, it is preferably a cylindrical shape formed by connecting a pair of disks attached to both ends of a rotational shaft 24 with a plurality of wires 25. The number of wires 25 is preferably 10 to 30, and more preferably 10 to 20. If the number is within this range, since the chopped fiber bundle precursor [a] 8 easily comes into contact with the wires 25, a single chopped fiber bundle precursor [a] 8 can be made into a plurality of chopped fiber bundles [A] having different fiber lengths, or a plurality of chopped fiber bundles [A] split along the fiber direction and having a small fiber bundle width, or a plurality of chopped fiber bundles [A] split in the thickness direction of the fiber bundle and thin in fiber bundle thickness. When the number of the plurality of wires 25 is smaller than the above-described lower limit, since the chopped fiber bundle precursor [a] 8 is hardly brought into contact with the wires, the chopped fiber bundles [A] having different fiber lengths, fiber bundle widths and fiber bundle thicknesses are hardly obtained. On the other hand, when the number of the plurality of wires 25 is larger than the above-described upper limit, the chopped fiber bundle [A] may be accumulated between the plurality of wires to make a continuous operation difficult.

Further, it is preferred that the distributor 6 is installed directly below the cutting machine 5, and the rotational shaft 24 of the distributor 6 is installed to be perpendicular to the thickness direction of the aggregate 14 comprising the chopped fiber bundles [A] and perpendicular to the conveying direction of the aggregate 14 comprising the chopped fiber bundles [A]. It is preferred that the width Lc of the distributor 6 is sufficiently larger than the width of the cutting machine 5.

Figure 2:
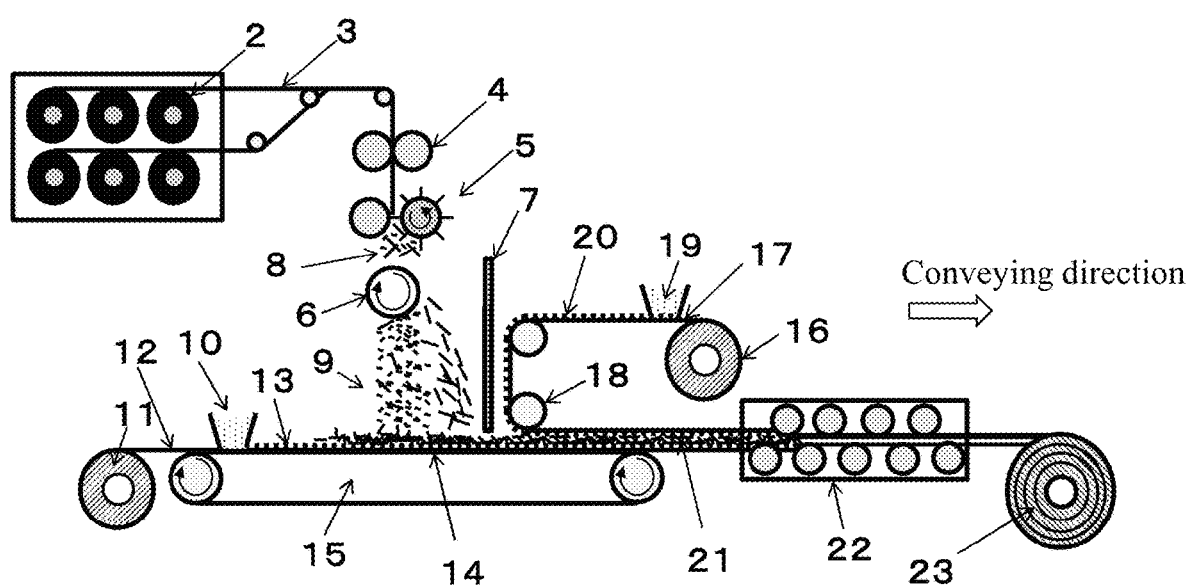
FIG. 2 is a schematic diagram showing an example of our process of producing a fiber-reinforced resin molding material.

A plurality of the chopped fiber bundles [A] 9 produced by colliding chopped fiber bundle precursors [A] 8 with the distributor 6 become chopped fiber bundles [A] 9 different in fiber length, fiber bundle width and fiber bundle thickness. When the rotating direction of the distributor 6 is clockwise (the same direction as the conveying direction of the first resin sheet 13) as shown in FIG. 2, the chopped fiber bundle [A] 9 having larger fiber length, fiber bundle width and fiber bundle thickness becomes easier to be deflected in the conveying direction by the impact of contact with the distributor 6. Therefore, the chopped fiber bundles [A] 9 having small fiber length, fiber bundle width and fiber bundle thickness are easily dropped onto the first resin sheet 13 directly under the distributor 6, and chopped fiber bundles [A] 9 having large fiber length, fiber bundle width and fiber bundle thickness are sequentially layered on the first resin sheet 13 as being conveyed in the conveying direction.

Further, the larger the rotational speed of the distributor 6 is, the more easily chopped fiber bundles [A] 9 large in fiber length, fiber bundle width, and fiber bundle thickness are deflected in the conveying direction. On the other hand, by installing the baffle plate 7 on the downstream side in the conveying direction of the distributor 6 as needed, the chopped fiber bundles [A] 9 deflected in the conveying direction can be forcibly dropped onto the first resin sheet 13. By combining these conditions, the layering structure of chopped fiber bundles [A] 9 different in fiber length, fiber bundle width and fiber bundle thickness in the fiber-reinforced resin molding material [C] can be controlled.

Figure 4:
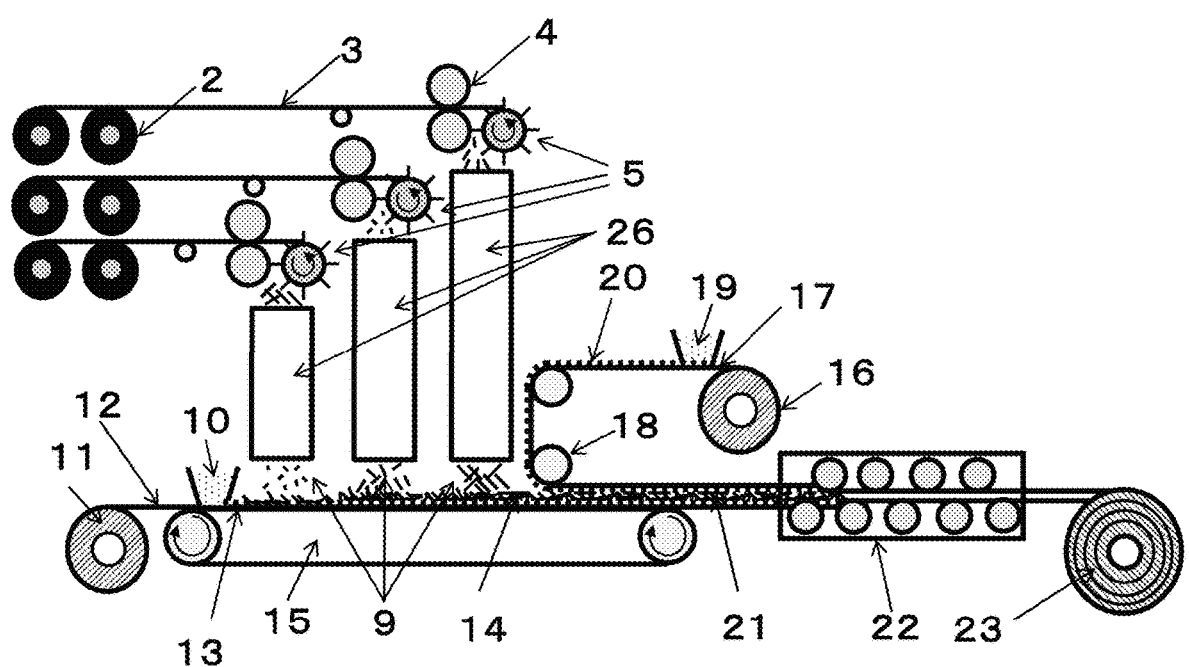
FIG. 4 is a schematic diagram showing an example of a stepwise scattering-system process for producing a fiber-reinforced resin molding material.

Further, as another method of controlling the layer structure of the fiber-reinforced resin molding material [C], as shown in FIG. 4, it is also possible to use a plurality of cutting machines 5, produce chopped fiber bundles [A] 9 different in fiber length, fiber bundle width and fiber bundle thickness under different cutting conditions, and scatter in a stepwise manner through a plurality of scattering towers 26 arranged in the conveying direction of the first resin sheet 13.

Further, the molded article obtained by molding the fiber-reinforced resin molding material [C] has excellent mechanical properties. The fiber-reinforced resin molding material [C] has excellent flowability and impregnation property, and is suitably used in a molded article partially different in thickness or having a complicated shape, which is complicated especially in flow during molding. Although the molding method of the molded article is not particularly limited, it can be obtained by a commonly-used press molding method using a fiber-reinforced resin molding material [C] 23. Namely, a mold vertically separable, which is formed in a target molded article shape, is prepared, and the fiber-reinforced resin molding material [C] 23 is placed in the cavity in a state of being smaller than the projection area of the cavity of the mold and thicker than the cavity thickness. In the molding method, next, heating and pressurizing are performed and then, the mold is opened to obtain a molded article. The molding temperature, the molding pressure and the molding time can be appropriately selected depending upon the shape of the target molded article.

EXAMPLES

Hereinafter, our materials, molded articles and methods will be explained further concretely by the examples.

The fiber reinforced resin molding material [C] was obtained by making a chopped fiber bundle precursor [A] obtained by cutting a continuous reinforcing fiber bundle collide with a distributor to produce one or a plurality of chopped fiber bundles [A], scattering the chopped fiber bundles [A] onto the first resin sheet 13 to form an aggregate comprising the chopped fiber bundles [A], and then impregnating the matrix resin [B] thereinto. With respect to the fiber-reinforced resin molding material [C] and a molded article obtained by press-molding the fiber-reinforced resin molding material [C], their properties were evaluated by the following evaluation methods.

Raw Materials
Continuous Reinforcing Fiber Bundle:
A continuous carbon fiber bundle having a fiber bundle of 7.2 a tensile modulus of 240 GPa, a number of filaments of 50,000 (supplied by Zoltek Corporation, product name "ZOLTEK" (registered trademark) PX35-50K) was used Matrix resin [B]:
A resin prepared by mixing 100 parts by weight of a vinyl ester resin (VE) (supplied by The Dow Chemical Company, "Derakane 790" (registered trademark)), 1 part by weight of tert-butylperoxybenzoate (supplied by Nippon Oil and Fat Co. Ltd., "Perbutyl Z" (registered trademark)), 2 parts by weight of zinc stearate (supplied by Sakai Chemical Industry Co. Ltd., SZ-2000) and 4 parts by weight of magnesium oxide (Kyowa Chemical Industry Co. Ltd., MgO #40) was used.

Method of Evaluating Shape of Chopped Fiber Bundle [A]
The fiber-reinforced resin molding material [C] was cut into a size of 200 mm×200 mm in a plane perpendicular to the thickness direction, the matrix resin [B] thereof was decomposed by heating in an electric furnace, and the weight X (g) of a sheet comprising the remaining chopped fiber bundles [A] was measured.

To divide the sheet comprising the chopped fiber bundles [A] into three layers (n=3), a wrap made of polyvinylidene chloride was pressed onto the surface of the sheet comprising the chopped fiber bundles [A] at a force of 8 g/cm², the chopped fiber bundles [A] were adhered thereto to be sampled, the weight of the adhered chopped fiber bundles [A] was repeatedly measured, and when the total value of the repeatedly measured weights reached the weight X (g)/3, the obtained group of chopped fiber bundles [A] was referred to as chopped fiber bundle [Aa] of the first outermost layer Fa. Subsequently, the group of the chopped fiber bundles [A] sampled by the same procedure whose total value of the weights reached the weight X (g)/3 was referred to as chopped fiber bundle [A2] of the central layer (F2). The group of the finally remaining chopped fiber bundles [A] was referred to as chopped fiber bundle [Aβ] of the second outermost layer (Fβ).

Next, in each layer, 100 chopped fiber bundles [A] were extracted randomly from the obtained group of chopped fiber bundles [A]. The chopped fiber bundle [A], in which a part of the chopped fiber bundle [A] was cut when a sample having a size of 200 mm×200 mm was cut out, because of being positioned at the periphery of the sample, was excluded. With respect to the 100 chopped fiber bundles [A] extracted from the group of each layer, as shown in FIG. 1, two points of La and Lb of each of the respective chopped fiber bundles [A] were measured with an accuracy of 0.1 mm by using calipers to obtain an average value as a fiber length, and the average of 100 fiber lengths was rounded up at the second decimal point to obtain the number-average fiber length [Lk] of each layer.

Then, one outermost layer having a smaller value among the calculated number-average fiber lengths [La] and [Lβ] of the two calculated outermost layers Fa and Fβ was referred to as F1, the number-average fiber length thereof was referred to as L1, and the other outermost layer was referred to as F3 and the number-average fiber length thereof was referred to as L3. The average fiber length of the chopped fiber bundle in the central layer F2 was referred to as L2.

The method of calculating the number-average fiber length [L] of the chopped fiber bundle [A] was as follows.

Number-average fiber length $[L]$ of chopped fiber bundle $[A]=(L1+L2+L3)/3$

Next, in the same procedure as when the fiber length was measured, the fiber-reinforced resin molding material [C] cut out into a size of 200 mm×200 mm was heated in an electric furnace to decompose the matrix resin [B] and the sheet comprising the remaining chopped fiber bundles [A] was divided into three layers. In each layer, 100 chopped fiber bundles [A] were extracted randomly from the obtained group of chopped fiber bundles [A]. The fiber bundle thickness was measured by using a thickness measuring instrument (supplied by Daiei Kagaku Seiki Seisakusho, FS-60DS) having a pair of indenters each having a flat plane with a diameter of 11.28 mm at upper and lower positions. The instrument was disposed so that the plane surrounded by a side for measuring the fiber length La or Lb of the chopped fiber bundle [A] and a side for measuring the fiber bundle width Wa was parallel to each plane of the indenters, and the thickness of the fiber bundle in a state of applying 30 g load from the indenters to the chopped fiber bundle [A] was measured with an accuracy of 0.01 mm. The average value of the thicknesses of 100 chopped fiber bundles [A] was rounded up at the fourth decimal point to obtain the number-average fiber bundle thickness [Tk] of each layer. When the chopped fiber bundle [A] used in the aforementioned measurement of the number-average fiber length [L] was also used to measure the thickness of the fiber bundle, the number-average fiber bundle thickness of the F1 layer determined by the measurement of the number-average fiber length [L] was referred to as T1, the number-average fiber bundle thickness of the F3 layer was referred to as T3, and the number-average fiber bundle thickness of the central layer F2 was referred to as T2. On the other hand, when the fiber bundle thickness was measured by the chopped fiber bundle [A] extracted separately from the measurement of the number-average fiber length [L], the F1-F3 layers were specified by the aforementioned measurement of the average fiber length before measurement of the fiber bundle thickness.

The method of calculating the number-average fiber bundle thickness [T] of the chopped fiber bundle [A] was as follows.

Number-average fiber bundle thickness $[T]$ of chopped fiber bundle $[A]=(T1+T2+T3)/3$ Further, in the same procedure as when the fiber length was measured, the fiber-reinforced resin molding material [C] cut out into a size of 200 mm×200 mm was heated in an electric furnace to decompose the matrix resin [B] and the sheet comprising the remaining chopped fiber bundles [A] was divided into three layers. In each layer, 100 chopped fiber bundles [A] were extracted randomly from the obtained group of chopped fiber bundles [A]. The maximum width Wa of the chopped fiber bundle [A] shown in FIG. 1 was measured by using calipers with an accuracy of 0.01 mm. The average value of the maximum widths Wa of 100 chopped fiber bundles [A] was rounded up at the third decimal point to obtain the number-average fiber bundle width [Wk] of each layer. When the chopped fiber bundle [A] used in the aforementioned measurement of the number-average fiber length [L] was used also for measuring the fiber bundle width, the number-average fiber bundle width of the F1 layer determined by the measurement of the number-average fiber length [L] was referred to as W1, the number-average fiber bundle width of the F3 layer was referred to as W3, and the number-average fiber bundle width of the central layer F2 was referred to as W2. On the other hand, when the fiber bundle width was measured by the chopped fiber bundle [A] extracted separately from the measurement of the number-average fiber length [L], the F1-F3 layers were specified by the aforementioned measurement of the average fiber length before measurement of the fiber bundle width.

The method of calculating the number-average fiber bundle width [W] of the chopped fiber bundle [A] was as follows.

Number-average fiber bundle width $[W]$ of chopped fiber bundle $[A]=(W1+W2+W3)/3$ Further, in the same procedure as when the fiber length was measured, the fiber-reinforced resin molding material [C] cut out into a size of 200 mm×200 mm was heated in an electric furnace to decompose the matrix resin [B] and the sheet comprising the remaining chopped fiber bundles [A] was divided into three layers. In each layer, 100 chopped fiber bundles [A] were extracted randomly from the obtained group of chopped fiber bundles [A]. As shown in FIG. 1, angles θ1 and θ2 on both sides of the end portions in each chopped fiber bundle [A] were measured with an accuracy of 1° by using a protractor, and the average value thereof was rounded up at the second decimal point to obtain an end angle [Ok] of each layer. When the chopped fiber bundle [A] used in the aforementioned measurement of the number-average fiber length [L] was used also for measuring the end portion angle, the number-average end portion angle of the F1 layer determined by the measurement of the number-average fiber length [L] was referred to as θ1, the end portion angle of the F3 layer was referred to as θ3, and the end portion angle of the central layer F2 was referred to as θ2. On the other hand, when the end portion angle was measured by the chopped fiber bundle [A] extracted separately from the measurement of the number-average fiber length [L], the F1-F3 layers were specified by the aforementioned measurement of the average fiber length before measurement of the end portion angle.

The calculation method of the number-average end portion angle [θ] of the chopped fiber bundle [A] was as follows.

Number-average end portion angle $[\theta]$ of chopped fiber bundle $[A]=(\theta1+\theta2+\theta3)/3$ Further, although the above-described evaluation method has been explained with respect to when an example described later where a sheet comprising the chopped fiber bundles [A] is divided into three layers (n=3), the same method can be employed even when the number of n is the other number of layers other than the three layers.

Method of Measuring Areal Weight of Chopped Fiber Bundle [A] in Fiber-Reinforced Resin Molding Material [C]

The fiber-reinforced resin molding material [C] was cut out to six pieces each having a size of 200 mm×200 mm. After measuring the weight Y (g) of each piece one by one up to a unit of 0.01 g by an electronic balance, the weight Z (g) after the resin was burnt by charging into an electric furnace was measured up to a unit of 0.01 g. The areal weight of the chopped fiber bundle was determined by converting the weight of Z (g) to a weight per 1 m$^2$ and determining an average value of the six pieces.

Method of Measuring Thickness of Fiber-Reinforced Resin Molding Material [C]

The fiber-reinforced resin molding material [C] was cut out to six pieces each having a size of 200 mm×200 mm. The measurement was performed by calipers at the midpoint of each side, and its average value was determined.

Method of Measuring Fiber Weight Content of Chopped Fiber Bundle [A] in Fiber-Reinforced Resin Molding Material [C]

The fiber weight content was determined by the following equation, and its average value was determined.

Weight content of chopped fiber bundle$=Z/Y\times100$

Method for Evaluating Fiber Bending

With respect to a molded plate of SMC, the surface on the side having been in contact with the lower mold during molding was observed visually, and one where bending of chopped fiber bundle [A] was observed was referred to as "present" and one where the bending was not observed was referred to as "none". The evaluation results are summarized in Table 1.

Method for Evaluating Flexural Properties

Flexural strength and flexural modulus were determined in accordance with JIS-K7017(1999).

To determine the flexural strength and the flexural modulus of a molded plate of SMC, six test pieces were cut out from the molded plate, respectively along the conveying direction (0° direction) and the width direction (90° direction) of the SMC, so that the thickness of the test piece/the thickness of the test piece was 50 and the width of the test piece was 25 mm. Then, using a 5 kN Instron universal testing machine, a four-point bending test was performed for each test piece at conditions of the distance between the fulcrum/the thickness of the test piece=40.5, the distance between the fulcrum=3×distance between indenters, and the crosshead speed 10 mm/min., the flexural strength and the flexural modulus of each piece were determined, and the average value and the coefficient of variation (CV) were determined. The evaluation results are summarized in Table 1.

Example 1

A first resin sheet was formed by drawing out a first carrier sheet made of polypropylene from a first sheet roll and supplying it to a first conveyor, and applying the paste of the matrix resin [B] thereto at a predetermined thickness using a doctor blade.

The continuous reinforcing fiber bundle drawn out from the bobbin was subjected to a widening treatment so that the fiber bundle width became 50 mm, and then separated into 16 bundles in the width direction by separation processing means set in parallel at equal intervals of 3 mm. By variation of the widening treatment and the separation processing in addition to nonuniformity of the continuous reinforcing fiber bundle, differences in fiber bundle thickness, fiber bundle width and number of filaments were observed in the width direction and the longitudinal direction of each separated continuous reinforcing fiber bundle.

The chopped fiber bundle precursor [a] was obtained by supplying the continuous reinforcing fiber bundle subjected to the separation processing at a constant speed while imparting an angle so that the cut angle became about 15° and cutting the separated continuous reinforcing fiber bundle continuously while changing the cutting speed.

A cylindrical distributor in which 20 wires were arranged was disposed just below the cutting machine. The rotational shaft of the distributor was arranged to be parallel to the surface of the first resin sheet and perpendicular to the conveying direction of the first resin sheet. The distributor was rotated at a speed of 400 rpm at a condition where the rotating direction of the distributor was set in the clockwise direction with respect to the rotational shaft of the distributor as shown by the arrow in FIG. 2. Further, a baffle plate was not used.

The chopped fiber bundle precursor [a] fell and collided with the distributor to produce one or more chopped fiber bundles [A] different in fiber length, fiber bundle width and fiber bundle thickness. Since the chopped fiber bundles [A] having larger fiber length, fiber bundle width and fiber bundle thickness were deflected more greatly in the conveying direction of the first resin sheet by the collision with the distributor, an aggregate comprising the chopped fiber bundles [A] stacked to gradually increase the fiber length, the fiber bundle width, and the fiber bundle thickness from the first resin sheet side was continuously formed.

Next, a second resin sheet was formed by drawing out a second carrier sheet made of polypropylene from a second sheet roll, supplying it to a second conveyor, and applying the paste of the matrix resin [B] with a predetermined thickness using a doctor blade.

A second resin sheet was laminated and stacked onto the aggregate comprising chopped fiber bundles [A], by pressurizing from both surfaces, the matrix resin [B] was impregnated into the aggregate comprising chopped fiber bundles [A] to obtain a fiber-reinforced resin molding material [C]. Thereafter, the fiber-reinforced resin molding material [C] was cured at a temperature of 25±5° C. for one week after the production, and the respective evaluations were carried out.

The thickness of the fiber-reinforced resin molding material [C] was 2.1 mm. The areal weight of the obtained chopped fiber bundle [A] was 1160 g/m$^2$, and the fiber weight content of the fiber-reinforced resin molding material [C] was 57.2%.

The fiber reinforced resin molding material [C] cut out into a size of 200 mm×200 mm was heated in an electric furnace to decompose the matrix resin [B], and the number-average fiber length, the number-average fiber bundle width, the number-average fiber bundle thickness and the number-average angle of the chopped fiber bundles [A] extracted from the remaining chopped fiber bundles [A] were measured, respectively, and the presence or absence of the fiber bending was evaluated. The measurement and evaluation results are shown in Table 1.

Further, the fiber-reinforced resin molding material [C] was cut out into 265×265 mm, the conveying directions (MD direction) of the fiber-reinforced resin molding materials [C] in the manufacturing apparatus of the fiber-reinforced resin molding material [C] were put in order, three fiber-reinforced resin molding materials [C] were stacked so that the outermost layer F1 of one fiber-reinforced resin molding material [C] was brought into contact with the outermost layer F3 of another fiber-reinforced resin molding material [C], and the stacked body was placed at the central portion on the flat plate mold having a 300×300 mm cavity so that the outermost layer F3 came into contact with the lower mold (corresponding to 80% as charge ratio), and thereafter, by a heating type press molding machine, it was cured at a condition of about 140° C.×5 minutes under a pressurized condition of 10 MPa to obtain a flat-plate molded article having a size of 300×300 mm×3 mm. The flexural strength of this molded article was 455 MPa, the coefficient of variation CV thereof was 6.1%, the flexural modulus was 37 GPa, and the coefficient of variation CV thereof was 4.4%. The evaluation results are shown in Table 1.

Example 2

A fiber-reinforced resin molding material [C] was obtained in the same manner as in Example 1 other than a condition where the distributor was rotated at a rotational speed of 300 rpm, and a molded article was obtained using this fiber-reinforced resin molding material [C]. The flexural strength of this molded article was 450 MPa and the flexural modulus was 34 GPa. The evaluation results are shown in Table 1.

Example 3

A fiber-reinforced resin molding material [C] was obtained in the same manner as in Example 1 other than a condition where a baffle plate was installed at a position on the downstream side (50 cm) in the conveying direction of the distributor, and a molded article was obtained using this fiber-reinforced resin molding material [C]. The flexural strength of this molded article was 436 MPa and the flexural modulus was 32 GPa. The evaluation results are shown in Table 1.

Example 4

A molded article was obtained in the same manner as in Example 1 other than conditions where a fiber-reinforced resin molding material [C] obtained in the same manner as in Example 1 was cut into 265×265 mm, and only one fiber-reinforced resin molding material [C] was placed at the central portion on a flat plate mold having a 300×300 mm cavity as described in Example 1. The flexural strength of this molded article was 450 MPa and the flexural modulus was 35 GPa. The evaluation results are shown in Table 1.

Comparative Example 1

A fiber-reinforced resin molding material [C] was obtained in the same manner as in Example 1 other than a condition where the distributor was not used, and a molded article was obtained using this fiber-reinforced resin molding material [C]. The flexural strength of this molded article was 380 MPa and the flexural modulus was 29 GPa. The evaluation results are shown in Table 1.

Comparative Example 2

A molded article was obtained in the same manner as in Example 1 other than conditions where a fiber-reinforced resin molding material [C] obtained in the same manner as in Comparative Example 1 was cut into 265×265 mm, and only one fiber-reinforced resin molding material [C] was placed at the central portion on a flat plate mold having a 300×300 mm cavity as described in Example 1. The flexural strength of this molded article was 378 MPa and the flexural modulus was 28 GPa. The evaluation results are shown in Table 1.

TABLE 1

| | | Unit | Example 1 | Example 2 | Example 3 | Example 4 | Comparative Example 1 | Comparative Example 2 |
|---|---|---|---|---|---|---|---|---|
| Used raw material | Reinforcing fiber | — | [A] | [A] | [A] | [A] | [A] | [A] |
| | Matrix resin | — | [B] | [B] | [B] | [B] | [B] | [B] |
| Chopped fiber bundle | Number-average fiber length L1 of outermost | mm | 10.9 | 10.7 | 11.4 | 10.9 | 11.4 | 11.4 |
| | Number-average fiber length L2 of central layer | mm | 11.0 | 11.0 | 11.5 | 11.0 | 11.6 | 11.5 |
| | Number-average fiber length L3 of outermost | mm | 13.0 | 12.0 | 11.8 | 13.0 | 11.5 | 11.4 |
| | L3/L1 | — | 1.19 | 1.12 | 1.04 | 1.19 | 1.01 | 1.00 |
| | Number-average fiber length L | mm | 11.6 | 11.24 | 11.56 | 11.6 | 11.5 | 11.4 |
| | Number-average fiber bundle thickness T1 of outermost layer F1 | mm | 0.047 | 0.058 | 0.064 | 0.047 | 0.069 | 0.069 |
| | Number-average fiber bundle thickness T2 of central layer F2 | mm | 0.060 | 0.068 | 0.065 | 0.060 | 0.068 | 0.068 |
| | Number-average fiber bundle thickness T3 of outermost layer F3 | mm | 0.076 | 0.076 | 0.066 | 0.076 | 0.070 | 0.069 |
| | T3/T1 | — | 1.60 | 1.31 | 1.03 | 1.60 | 1.01 | 1.00 |
| | Number-average fiber bundle thickness T | mm | 0.061 | 0.067 | 0.065 | 0.061 | 0.069 | 0.069 |
| | Number-average fiber bundle width W1 of outermost layer F1 | mm | 1.30 | 1.80 | 2.00 | 1.30 | 2.13 | 2.13 |
| | Number-average fiber bundle width W2 of central layer F2 | mm | 1.66 | 2.09 | 2.15 | 1.66 | 2.16 | 2.16 |
| | Number-average fiber bundle width W3 of outermost layer F3 | mm | 1.72 | 2.16 | 2.20 | 1.72 | 2.14 | 2.15 |
| | W3/W1 | — | 1.32 | 1.20 | 1.10 | 1.32 | 1.00 | 1.01 |
| | Number-average fiber bundle width W | mm | 1.56 | 2.02 | 2.12 | 1.56 | 2.14 | 2.15 |
| | Number-average cut angle | ° | 15.6 | 15.3 | 15.5 | 15.6 | 15.4 | 15.4 |
| Chopped fiber bundle sheet | Areal weight E of chopped fiber bundle [A] | g/m$^2$ | 1160 | 1150 | 1145 | 1158 | 1155 | 1153 |
| Fiber-reinforced resin molding material | Fiber weight content | % | 57.2 | 56.8 | 56.6 | 57.0 | 56.9 | 57.1 |
| | Thickness | mm | 2.1 | 2.0 | 2.0 | 2.1 | 2.1 | 2.0 |
| Molded article | Fiber bending | — | none | none | none | none | present | present |
| | Flexural strength | MPa | 455 | 445 | 436 | 450 | 380 | 378 |
| | CV of flexural strength | % | 6.1 | 8.4 | 9.6 | 6.4 | 11.8 | 13.0 |
| | Flexural modulus | GPa | 37 | 34 | 32 | 35 | 29 | 28 |
| | CV of flexural modulus | % | 4.4 | 5.5 | 6.4 | 4.8 | 7.5 | 8.2 |

INDUSTRIAL APPLICABILITY

As uses of our fiber-reinforced resin molding material and the molded article, exemplified are an automotive member such as a door, a bumper reinforcement material or a seat (panel or frame), a bicycle member such as a crank and a wheel rim, a sports member of golf or tennis such as a golf club head or a racket, a transportation vehicle member such as an interior material, an aircraft member, or an industrial machine member such as a robot arm, requiring light weight property and excellent mechanical properties. Among them, our concepts can be preferably applied to an automotive member such as a door, a bumper reinforcement material or a seat (panel or frame), requiring molding followability to a complicated shape in addition to light weight property.

The invention claimed is:

1. A fiber-reinforced resin molding material [C] comprising a chopped fiber bundle [A] and a matrix resin [B], wherein, when divided into n layers along a thickness direction of the fiber-reinforced resin molding material [C], a number-average fiber length [Lk] of a chopped fiber bundle [Ak] constituting each layer Fk ($1 \leq k \leq n$) gradually increases from one outermost layer F1 of the fiber-reinforced resin molding material [C] toward another outermost layer Fn, wherein, when divided into n layers along the thickness direction of the fiber-reinforced resin molding material [C], a number-average fiber bundle thickness [Tk] of the chopped fiber bundle [Ak] constituting each layer Fk gradually increases from one outermost layer F1 of the fiber-reinforced resin molding material [C] toward another outermost layer Fn.

2. The fiber-reinforced resin molding material according to claim 1, wherein a number-average fiber length [L1] of a chopped fiber bundle [A1] constituting one outermost layer F1 and a number-average fiber length [Ln] of a chopped fiber bundle [An] constituting another outermost layer Fn satisfy equation (1)

$$1.01 < Ln/L1 \leq 1.5 \tag{1}$$

3. The fiber-reinforced resin molding material according to claim 1, wherein a number-average fiber bundle thickness [T1] of a chopped fiber bundle [A1] constituting one outermost layer F1 and a number-average fiber bundle thickness [Tn] of a chopped fiber bundle [An] constituting another outermost layer Fn satisfy equation (2)

$$1.01 < Tn/T1 \leq 2.0 \tag{2}$$

4. The fiber-reinforced resin molding material according to claim 1, wherein a number-average fiber length [L] of the chopped fiber bundle [A] is 3 mm or more and 100 mm or less.

5. The fiber-reinforced resin molding material according to claim 1, wherein a number-average fiber bundle thickness [T] of the chopped fiber bundle [A] is 0.01 mm or more and 0.4 mm or less.

6. The fiber-reinforced resin molding material according to claim 1, wherein a number-average cut angle θ of the chopped fiber bundle [A] is $0° < θ < 90°$.

7. The fiber-reinforced resin molding material according to claim 1, wherein the matrix resin [B] is a thermosetting resin.

8. The fiber-reinforced resin molding material according to claim 1, wherein n of the divided layers is $n \geq 3$.

9. A molded article obtained by molding a fiber-reinforced resin molding material according to claim 1.

10. A fiber-reinforced resin molding material [C] comprising a chopped fiber bundle [A] and a matrix resin [B], wherein, when divided into n layers along a thickness direction of the fiber-reinforced resin molding material [C], a number-average fiber length [Lk] of a chopped fiber bundle [Ak] constituting each layer Fk ($1 \leq k \leq n$) gradually increases from one outermost layer F1 of the fiber-reinforced resin molding material [C] toward another outermost layer Fn, wherein, when divided into n layers along the thickness direction of the fiber-reinforced resin molding material [C], a number-average fiber bundle width [Wk] of the chopped fiber bundle [Ak] constituting each layer Fk gradually increases from one outermost layer F1 of the fiber-reinforced resin molding material [C] toward another outermost layer Fn.

11. The fiber-reinforced resin molding material according to claim 10, wherein a number-average fiber bundle width [W1] of a chopped fiber bundle [A1] constituting one outermost layer F1 and a number-average fiber bundle width [Wn] of a chopped fiber bundle [An] constituting another outermost layer Fn satisfy equation (3)

$$1.01 < Wn/W1 \leq 1.6 \tag{3}$$

12. The fiber-reinforced resin molding material according to claim 10, wherein a number-average fiber bundle width [W] of the chopped fiber bundle [A] is 0.5 mm or more and 60 mm or less.

13. The fiber-reinforced resin molding material according to claim 10, wherein a number-average fiber length [L1] of a chopped fiber bundle [A1] constituting one outermost layer F1 and a number-average fiber length [Ln] of a chopped fiber bundle [An] constituting another outermost layer Fn satisfy equation (1)

$$1.01 < Ln/L1 \leq 1.5 \tag{1}$$

14. The fiber-reinforced resin molding material according to claim 10, wherein a number-average fiber length [L] of the chopped fiber bundle [A] is 3 mm or more and 100 mm or less.

15. The fiber-reinforced resin molding material according to claim 10, wherein a number-average cut angle θ of the chopped fiber bundle [A] is $0° < θ < 90°$.

16. The fiber-reinforced resin molding material according to claim 10, wherein the matrix resin [B] is a thermosetting resin.

17. The fiber-reinforced resin molding material according to claim 10, wherein n of the divided layers is $n \geq 3$.

18. A molded article obtained by molding a fiber-reinforced resin molding material according to claim 10.

* * * * *